United States Patent Office 2,990,393
Patented June 27, 1961

2,990,393
PROCESS FOR MAKING GRAFT COPOLYMERS CONTAINING ACRYLONITRILE AND A VINYL PYRIDINE
Harry W. Coover, Jr., and Joseph B. Dickey, Kingsport, Tenn., assignors to Eastman Kodak Company, Rochester, N.Y., a corporation of New Jersey
No Drawing. Filed July 24, 1958, Ser. No. 750,568
5 Claims. (Cl. 260—45.5)

This invention relates to graft copolymers containing combined acrylonitrile and a vinyl pyridine, and is particularly concerned with modified polymers prepared by graft copolymerizing acrylonitrile alone in a solution or emulsion of a "live" homopolymer or copolymer of a vinyl pyridine. From such graft polymers many shaped articles including fibers can be formed which have improved physical and chemical properties.

This application is a continuation-in-part of our copending application, Serial No. 409,511 filed February 10, 1954 now abandoned, which in turn is a continuation-in-part of Serial No. 268,340 filed January 25, 1952, and now abandoned.

Graft copolymers are prepared by first homopolymerizing or copolymerizing suitable monoethylenic monomeric material, and thereafter polymerizing another monomer, preferably acrylonitrile, with the preformed polymer. In the case of the modified polymers embodying this invention, the graft copolymerization with the acrylonitrile is carried out in the polymerization reaction mixture in which the preformed polymer was prepared and from which the polymer has not been separated. The preformed polymer is thus a "live" polymer which is thereafter combined with the acrylonitrile to give a polymer having a structural configuration in the molecule quite unlike the random structure obtained by the simultaneous interpolymerization of the same components in a single reaction mixture. Graft polymers are thus prepared by a directed placement of the grafting monomer with the preformed polymer. By effecting the polymerization in this manner, polymers are obtained whose chemical and physical properties differ markedly from the properties of simple interpolymers such as copolymers which are prepared by simultaneously polymerizing two monomers, terpolymers which are prepared by interpolymerizing three monomers simultaneously, and similar interpolymers.

Heretofore fibers of unmodified polyacrylonitrile have been spun which have excellent physical properties such as high strength, high sticking temperature, and good resistance to shrinkage at elevated temperatures. However, such unmodified polyacrylonitrile fibers show low moisture absorption and poor dyeability with most presently available dyes. For a great many textile purposes, improved dyeability of acrylonitrile type fibers would be highly desirable.

Attempts have been made to increase the dyeability shaped polyacrylonitrile articles such as fibers by interpolymerizing acryonitrile with certain monomers whose polymers have an affinity for dyes. While such procedures do give polymer products, from which fibers having dyeing properties can be obtained, they may introduce unwanted properties as, for example, a substantial lowering of the softening point of the fiber.

It is known that greatly increased moisture absorption and dyeability of acrylonitrile polymer fibers can be obtained by copolymerizing acrylonitrile with certain hydrophilic monomers such as acids, amides, esters, etc. which contain an unsaturated ethylene linkage. The improvement in these properties varies with type and amount of the monomer copolymerized with acrylonitrile. When an amount of the modifying compound has been copolymerized with acrylonitrile, sufficient to give desirable moisture absorption and dyeability, it is usually found that the resulting fibers have such low sticking temperatures and high shrinkage at elevate temperatures that they are not suitable for most textile purposes. For example, when acrylonitrile is copolymerized with 15 to 25% vinyl pyridine, the resulting fibers show good moisture absorption and dyeability, but their sticking temperature is too low being approximately 150° C., and they will shrink about 50% in length in boiling water. Polyacrylonitrile fibers, on the other hand, with no modifier have a sticking temperature of 200° C. or higher, and will shrink only about 5% in boiling water, but, as mentioned previously, they will not dye effectively.

The amount of reduction in sticking temperature and increase in shrinkage at elevated temperatures of fibers obtained from copolymers of acrylonitrile and hydrophilic monomers varies with the amount and type of modifying monomer, but a loss in these two desirable properties of polyacrylonitrile fibers by copolymerization is usually the case.

Polyacrylonitrile can also be modified by the mechanical mixing of other hydrophilic polymers with it such as acids, amides, esters, etc. to improve dye affinity and moisture absorption. However, solutions of mechanical mixtures of polyacrylonitrile with other hydrophilic polymers are usually incompatible. These incompatible solutions are difficult to spin into fibers having good physical properties. Further, the fibers obtained from these incompatible mixtures tend to have low softening points and may stiffen badly in the dye bath.

An object, therefore, of the present invention is to provide acrylonitrile polymer compounds which are modified in structure so as to possess improved physical and chemical properties.

Another object of the invention is to provide methods for making these modified acrylonitrile polymer compounds.

Still another object is to provide homogeneous solutions containing modified acrylonitrile-containing polymers. Another object is to provide fibers from these homogeneous solutions which have low shrinkage and improved dyeability and methods for making the fiber.

Other objects will become apparent hereinafter.

The modified polymers of this invention are prepared by polymerizing monomeric acrylonitrile, as the sole polymerizable monomer, in the presence of preformed certain homopolymers or copolymers of vinyl pyridine or substituted vinyl pyridine which have not been separated from their polymerization medium prior to the addition of monomeric acrylonitrile. Polymers prepared by this process have excellent solubility properties and when spun into fibers have higher softening points and better solubility and dyeability properties than other polymers having the same over-all composition prepared by the prior art methods mentioned above. The acrylonitrile polymers can be modified in accordance with the invention up to 40% without any appreciable change in desirable physical and chemical properties and the resultant dyed structures have yarn color much superior to that of dyed fibers prepared from unmodified acrylonitrile polymers. The preferred range of modifier composition is from 5 to 45%.

The present invention is particularly concerned with the use of vinyl pyridines, with or without a methyl substituent on the nucleus, and is especially concerned with unsubstituted vinyl pyridine or with 2-methyl-5-vinyl pyridine. These vinyl pyridines can be homopolymerized or interpolymerized with acrylonitrile to form a preformed homopolymer or copolymer which is then admixed with monomeric acrylonitrile for the graft copolymerization in accordance with the invention.

The polymers embodying this invention contain at least 5% by weight of combined vinyl pyridine, and at least 5% by weight of combined acrylonitrile. As used in this application, the term "vinyl pyridine" is intended to include the unsubstituted and substituted vinyl pyridines as disclosed, and the term "unsubstituted vinyl pyridine" is used to designate the material containing no ring alkyl substituents. The preferred class of graft copolymers prepared in accordance with this invention are those wherein the vinyl pyridine homopolymer or copolymer is graft polymerized with the acrylonitrile in such proportions and to such a degree of conversion that the graft polymer contains from 5 to 45% by weight of combined vinyl pyridine and from 55 to 95% by weight of combined acrylonitrile. The polymers in this preferred range of compositions retain the desirable properties of polyacrylonitrile polymers, and in addition have a greatly increased affinity for dyes, as well as an increased lightfastness, particularly in the case of certain preformed copolymers as described hereinafter.

The preformed interpolymers which are of particular utility are those wherein 5 to 95% by weight of a vinyl pyridine is interpolymerized with 95–5% by weight of acrylonitrile, with the interpolymers containing at least 25% by weight of vinyl pyridine being preferred.

The graft copolymers prepared by polymerizing acrylonitrile alone on a preformed vinyl pyridine homopolymer or a vinyl pyridine-acrylonitrile copolymer give improved results over the corresponding graft copolymers wherein the preformed polymer is a different vinyl pyridine copolymer. Thus, for example, a graft copolymer of acrylonitrile as the sole grafting monomer on a preformed vinyl pyridine homopolymer has greatly improved affinity for acid wool dyes as compared to a graft copolymer of acrylonitrile on a preformed vinyl pyridine-N-alkyl-acrylamide copolymer, as shown in Examples 1 and 2.

Example 1

0.5 gram of 2-methyl-5-vinylpyridine was dissolved in 10 ml. of water containing 0.01 gram of ammonium persulfate and 0.05 ml. of Tergitol No. 4 having the formula

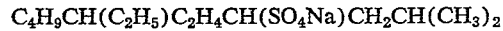
$$C_4H_9CH(C_2H_5)C_2H_4CH(SO_4Na)CH_2CH(CH_3)_2$$

The solution was tumbled 24 hours at 50° C. The resulting emulsion was cooled to 25° C. and 9.5 grams of acrylonitrile was added along with 0.1 gram of ammonium persulfate and 0.1 gram of sodium metabisulfite and was tumbled 16 hours at 35° C. The resultant polymer contained 5% vinylpyridine by analysis, and was soluble in dimethylformamide. Fibers obtained from the polymer had a softening point of about 200° C. and showed outstanding affinity for acid-wool dyes.

Example 2

0.35 gram of N-5-butylacrylamide and 0.15 gram of 2-methyl-5-vinylpyridine were dissolved in water along with 0.01 gram of ammonium persulfate and 0.05 ml. of Tergitol No. 4. The solution was tumbled 24 hours at 50° C. The resulting emulsion was cooled to 25° C. and 9.5 grams of acrylonitrile along with 0.1 gram of ammonium persulfate and 0.1 gram of sodium metabisulfite and was tumbled 16 hours at 35° C. The resultant polymer was soluble in dimethylformamide. Fibers obtained from the polymer had a softening point of about 200° C. but were just barely tinted by acid-wool dyes.

Furthermore, the use of preformed vinyl pyridine-acrylonitrile copolymers as the preformed polymer gives products having superior resistance to alkali discoloration as compared to the use of the closely related vinyl pyridine-acrylamide copolymers as the preformed polymer. This is illustrated by Examples 3 and 4.

Example 3

0.3 gram of acrylonitrile and 0.2 gram of 2-vinylpyridine were dissolved in 10 ml. of water containing 0.01 gram of ammonium persulfate and 0.05 ml. of Tergitol No. 4. The solution was tumbled 24 hours at 50° C. The resulting emulsion was cooled to 25° C. and 9.5 grams of acrylonitrile was added along with 0.1 gram of ammonium persulfate and 0.1 gram of sodium metabisulfite and was tumbled for 16 hours at 35° C. The resultant polymer was soluble in dimethyl formamide and was spun into fibers that softened at 200° C. The fibers did not discolor when boiled for twenty minutes in aqueous sodium carbonate.

Example 4

0.3 gram of N,N-dimethylacrylamide and 0.2 gram of 2-vinylpyridine were dissolved in 10 ml. of water containing 0.01 gram of ammonium persulfate and 0.05 ml. of Tergitol No. 4. The solution was tumbled 24 hours at 50° C. The resulting solution was cooled to 25° C. and 9.5 grams of acrylonitrile was added along with 0.1 gram of ammonium persulfate and 0.1 gram of ammonium metabisulfite and was tumbled for 16 hours at 35° C. The resultant polymer was soluble in dimethylformamide and was spun into fibers that softened at about 200° C. The fibers turned yellow when boiled for twenty minutes in aqueous sodium carbonate.

The invention is further illustrated by the following examples:

Example 5

1.5 grams of 2-methyl-5-vinyl pyridine was emulsified in 90 cc. of water containing 1 g. of sodium lauryl sulfate. 0.02 gram of potassium persulfate and 0.01 gram of sodium bisulfate were added and polymerization completed by heating at 35° C. for 6 hours. 8.5 g. of acrylonitrile, 0.1 gram of potassium persulfate and 0.05 gram of sodium bisulfite were then added to the emulsion. The polymerization was completed by agitating an additional 4 hours at 40° C. The yield of isolated washed polymers =9.7 grams. The polymer was easily soluble in N,N-dimethyl acetamide. Fibers spun from the polymer had a tenacity of 2.8 g./d. and a softening point above 230° C. and showed excellent affinity for acid dyes.

Example 6

1 g. of 2-methyl-5-vinyl pyridine was emulsified in 100 cc. of distilled water containing 2 g. of sodium lauryl sulfate and 0.05 g. of potassium persulfate. The emulsion was heated and agitated at 50° C. for 4 hours. The emulsion was cooled to room temperature and 9 g. of acrylonitrile, 0.1 g. of potassium persulfate and 0.05 g. of sodium bisulfite were added. The polymerization was completed by heating to 40° C. for 4 hours. Yield of isolated polymer=9.7 g.

Fiber spun from a dope in dimethyl formamide has a tenacity of 3.4 g./d. and showed excellent affinity for wool dyes.

Example 7

1 g. of 2-methyl-5-vinyl pyridine and 0.5 g. of acrylonitrile were emulsified in 80 cc. of water containing 2 g. of sodium lauryl sulfate and 0.05 g. of potassium persulfate. The emulsion was agitated at 50° C. for 6 hours. The emulsion was cooled to room temperature and 8.5 g. of acrylonitrile, 0.1 g. of potassium persulfate and 0.05 g. of sodium bisulfite were added. The polymerization was completed by heating to 40° C. for 4 hours. The yield of isolated polymer=9.6 g.

Fibers spun from the polymer had a tenacity of 3.2 g./d., softening point above 215° C. and showed good affinity for wool dyes.

Example 8

Two grams of 2-vinyl pyridine and 1 g. of acrylonitrile were added to 100 ml. of distilled water containing 0.05 g. of ammonium persulfate, 0.05 g. of sodium bisulfite and 0.5 ml. of Tergitol No. 4. The emulsion was tumbled at 35° C. for 12 hours. The emulsion was cooled to room temperature and 7 g. of acrylonitrile was added along with 0.1 g. of ammonium persulfate and 0.1 g. of sodium bisulfite and tumbled for 12 more hours at 40° C. The isolated, washed and dried polymer weighed 9.4 g. and was readily soluble in dimethyl formamide.

*Example 9*

5 grams of 2-vinyl pyridine were dissolved in 110 ml. of water containing 0.1 g. ammonium persulfate and 0.5 ml. of Tergitol No. 4 having the formula

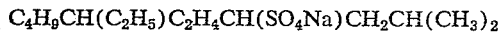

$$C_4H_9CH(C_2H_5)C_2H_4CH(SO_4Na)CH_2CH(CH_3)_2$$

The solution was tumbled 24 hours at 45° C. The resulting emulsion was cooled to 25° C. and 15 g. of acrylonitrile added along with 0.1 g. of ammonium persulfate and 0.1 g. of sodium bisulfite and tumbled 16 hours at 35° C. The resultant polymer contained 24 percent vinyl pyridine by analysis and was soluble in such solvents as dimethylformamide and dimethylacetamide. Fibers obtained from the polymer had a softening point about 200° C. and showed excellent affinity for acetate, wool, direct, and vat dyes.

*Example 10*

4 grams of 4-vinyl pyridine were added to 100 ml. of distilled water containing 0.1 g. of ammonium persulfate and 0.5 ml. of Tergitol No. 4. The emulsion was tumbled 24 hours at 50° C. The resulting emulsion was cooled to 25° C. and 6 g. of acrylonitrile was added along with 0.1 g. of ammonium persulfate and 0.1 g. of sodium bisulfite and tumbled 16 hours at 35° C. The resultant polymer was filtered, washed and dried. The polymer contained 35% vinyl pyridine by analysis and was soluble in such solvents as dimethylacetamide and dimethylformamide. Fibers obtained from the polymer had a softening point above 190° C. and showed excellent affinity for acetate, direct, wool, and vat dyes.

*Example 11*

3 grams of 2-vinyl-6-methylpyridine were added to 100 ml. of distilled water containing 0.1 g. of ammonium persulfate and 0.5 ml. of Tergitol No. 4. The emulsion was tumbled 24 hours at 50° C. The resulting emulsion was cooled to 25° C. and 7 grams of acrylonitrile was added along with 0.1 g. of ammonium persulfate and 0.1 g. of sodium bisulfite and tumbled 16 hours at 35° C. The isolated polymer contained 28 percent vinyl pyridine by analysis and was soluble in such solvents as dimethylformamide and dimethylacetamide. Fibers obtained from the polymer had a softening point above 200° C. and showed excellent affinity for direct, acid, acetate and vat dyes.

*Example 12*

Nine and five-tenths g. of 2-methyl-5-vinylpyridine was emulsified in 190 g. of water containing 1.0 g. of sodium lauryl sulfate, 0.02 g. of potassium persulfate, and 0.02 g. of potassium metabisulfite. The resulting mixture was allowed to polymerize at 25° C. for 16 hours. There was then added 0.5 g. of acrylonitrile, and the mixture was heated at 35° C. for 10 hours. The resultant graft polymer was readily soluble in dimethylformamide and gave a dope which on mixing was compatible with dimethylformamide dopes of polyacrylonitrile.

Our new polymeric compositions are distinguished in that the interpolymerization of the original polymerization mixture of our invention is substantially complete before the added acrylonitrile is subjected to polymerization conditions. The acrylonitrile thus is able to extend the length of the interpolymer chain with units consisting entirely of acrylonitrile, and the product has the valuable tenacity and high softening properties of polyacrylonitrile, while the new and important property of dye susceptibility is imparted thereto.

In preparing the polymer compositions of our invention, the interpolymerization comprising the first step of our process is continued until substantially complete i.e. further heating produces no additional polymerization, and the acrylonitrile monomer is then added and the polymerization continued.

The polymerization is advantageously carried out in an aqueous medium, although other reaction media, such as organic solvents, can be employed; for example, a polymerization medium consisting of aqueous acetone, or other aqueous solvent can be used.

The polymerizations can be accelerated by the use of a well-known polymerization catalyst. Such catalysts are commonly used in the art of polymerization, and our invention is not to be limited to any particular catalyst material. Catalysts which have been found to be especially useful comprise the peroxy polymerization catalysts, such as the organic peroxides (e.g. benzoyl peroxide, acetyl peroxide, acetyl benzoyl peroxide, lauryl peroxide, oleoyl peroxide, triacetone peroxide, urea peroxide, t-butyl hydroperoxide, alkyl percarbonates, etc.) hydrogen peroxide, perborates (e.g. alkali metal perborates, such as those of sodium and potassium, etc.) persulfate (e.g. alkali metal ammonium persulfate etc.). Other catalysts such as the ketazines, azines, etc. can be used. The quantity of catalyst used can be varied, depending on the monomer, amount of diluent, etc. Sufficient catalyst can be used to interpolymerize the pyridine monomers and the added monomeric acrylonitrile, or an amount of catalyst sufficient to interpolymerize only the pyridine monomers can be used, and additional catalyst can be added with the acrylonitrile monomer to complete the polymerization. The catalyst added along with acrylonitrile may be the same catalyst that was used to polymerize the pyridine monomers. We have found that it is especially advantageous to use an amount of catalyst sufficient to interpolymerize only the initial monomers, and then upon addition of the acrylonitrile to add a further amount of catalyst at that time. This procedure provides a readier means for regulating the molecular weight distribution of the polymer composition.

The temperatures at which the process of our invention can be carried out vary from ordinary room temperature to the reflux temperature of the reaction mixture. Generally a temperature of from 25° to 75° C. is sufficient. It is desirable to cool the initial polymerization mixture somewhat before adding the monomeric acrylonitrile.

If desired, emulsifying agents can be added to the reaction mixture to distribute uniformly the reactants throughout the reaction medium. Typical emulsifying agents include the alkali metal salts of certain alkyl acid sulfates e.g. sodium lauryl sulfate), alkali metal salts of aromatic sulfonic acids (sodium isobutylnaphthalenesulfonate), alkali metal or amine addition salts of sulfosuccinic acid esters, alkali metal salts of fatty acids containing from 12 to 20 carbon atoms, sulfonated fatty acid amides, alkali metal salts of alkane sulfonic acids, sulfonated esters, etc.

The polymerization can be carried out in the presence of chain regulators, such as hexyl, octyl, lauryl, dodecyl, myristyl mercaptans, etc. which impart improved solubility properties to the polymer compositions. If desired, reducing agents such as alkali metal bisulfites (e.g. potassium, sodium, etc. bisulfites) can be added to reduce the time required for the polymerization to be effected.

In the process embodying this invention, the initial polymerization by which the preformed "live" polymer is formed, is carried out until the polymerization is substantially complete. The polymerization reaction mixture thus obtained contains the preformed polymer in active form. This polymerization reaction mixture is then admixed with the acrylonitrile used in the grafting stage, and the polymerization is carried out until the graft copolymer obtained contains at least 5% by weight of combined acrylonitrile and at least 5% by weight of combined vinyl pyridine.

The polymerization in the second or grafting step can be either partial or complete as desired. In the case of batch processes, the polymerization in the second step is desirably substantially complete in order to avoid the necessity of separating unreacted acrylonitrile from the graft polymer. If desired, however, the polymerization can be stopped at any desired point, even in the case of a batch process. When the processing is effected in continuous fashion, it is not necessary to carry the polymerization to completion, since the reaction monomer can be recycled in the process. In some cases, it is desirable to carry out the second step polymerization to a conversion of from about 60 to 90%, since the polymer thereby obtained possesses particularly desirable solubility characteristics.

Although the invention has been described in considerable detail with particular reference to certain preferred embodiments thereof, variations and modifications can be effected within the spirit and scope of the invention as described herein, and as defined in the appended claims.

We claim:

1. A process for preparing a resinous fiber-forming graft copolymer which comprises heating a polymerization reaction mixture comprising (1) water, (2) a peroxide polymerization catalyst and (3) from 5–45 parts by weight of a polymer selected from the group consisting of homopolymers of unsubstituted vinyl pyridines, homopolymers of vinyl pyridines having a methyl group substituent on the pyridyl nucleus and copolymers of from 5–95% by weight of said vinyl pyridines and 95–5% by weight of acrylonitrile, the said polymer having been formed in and not separated from said mixture and containing, in polymerized form, substantially 100% of the polymerizable monomers originally present in said mixture, with (4) conversely from 55–95 parts by weight of acrylonitrile monomer, until at least 60% of said acrylonitrile monomer has combined with the said polymer to give the said graft copolymer.

2. A process for preparing a resinous fiber-forming graft copolymer which comprises heating a polymerization reaction mixture comprising (1) water, (2) a peroxide polymerization catalyst and (3) from 5–45 parts by weight of poly-2-methyl-5-vinyl pyridine formed in and not separated from said mixture and containing, in polymerized form, substantially 100% of the monomeric 2-methyl-5-vinyl pyridine originally present in said mixture, with (4) conversely from 55–95 parts by weight of acrylonitrile monomer, until at least 60% of said acrylonitrile monomer has combined with the said polymer to give the said graft copolymer.

3. A process for preparing a resinous fiber-forming graft copolymer which comprises heating a polymerization reaction mixture comprising (1) water, (2) a peroxide polymerization catalyst and (3) from 5–45 parts by weight of poly-2-vinyl pyridine formed in and not separated from said mixture and containing, in polymerized form, substantially 100% of the monomeric 2-vinyl pyridine originally present in said mixture, with (4) conversely from 55–95 parts by weight of acrylonitrile monomer, until from at least 60% of said acrylonitrile monomer has combined with the said polymer to give the said graft copolymer.

4. A process for preparing a resinous fiber-forming graft copolymer which comprises heating a polymerization reaction mixture comprising (1) water, (2) a peroxide polymerization catalyst and (3) from 5–45 parts by weight of a copolymer of 5–95% by weight of 2-methyl-5-vinyl pyridine and conversely 95–5% by weight of acrylonitrile formed in and not separated from said mixture and containing, in polymerized form, substantially 100% of the said monomers 2-methyl-5-vinyl pyridine and acrylonitrile originally present in said mixture, with (4) conversely from 55–95 parts by weight of acrylonitrile monomer, until at least 60% of said acrylonitrile monomer has combined with the said polymer to give the said graft copolymer.

5. A process for preparing a resinous fiber-forming graft copolymer which comprises heating a polymerization reaction mixture comprising (1) water, (2) a polymerization catalyst and (3) from 5–45 parts by weight of a polymer selected from the group consisting of homopolymers of unsubstituted vinyl pyridines, homopolymers of vinyl pyridines having a methyl group substituted on the pyridyl nucleus and copolymers of from 5–95% by weight of said vinyl pyridines and 95–5% by weight of acrylonitrile, the said polymer having been formed in and not separated from said mixture and containing, in polymerized form, substantially 100% of the polymerizable monomers originally present in said mixture, with (4) conversely from 55–95 parts by weight of acrylonitrile monomer, until at least 60% of said acrylonitrile monomer has combined with the said polymer to give the said graft copolymer.

References Cited in the file of this patent

UNITED STATES PATENTS

| | | |
|---|---|---|
| 2,538,779 | Harrison et al. | Jan. 23, 1951 |
| 2,640,049 | Rothrock | May 26, 1953 |
| 2,657,191 | Coover et al. | Oct. 27, 1953 |
| 2,688,008 | Chaney et al. | Aug. 31, 1954 |
| 2,746,943 | Pritchard | May 22, 1956 |
| 2,749,325 | Craig | June 5, 1956 |

FOREIGN PATENTS

| | | |
|---|---|---|
| 508,726 | Belgium | July 25, 1952 |